(12) United States Patent
Oode et al.

(10) Patent No.: US 9,937,598 B2
(45) Date of Patent: Apr. 10, 2018

(54) COVER FOR CUTTING TOOL, HOLDER FOR CUTTING, AND CUTTING DEVICE

(75) Inventors: Hisayuki Oode, Tokyo (JP); Shinya Matsuo, Tokyo (JP); Manabu Saito, Tokyo (JP); Morihiro Hideta, Nara (JP); Koji Sato, Nabari (JP); Yasuhiro Inamasu, Iga (JP); Shoujirou Touma, Narita (JP)

(73) Assignees: SUBARU CORPORATION, Tokyo (JP); DMG MORI SEIKI CO., LTD., Tokyo (JP); MITSUBISHI HITACHI TOOL ENGINEERING, LTD., Yamatokoriyama-Shi, Nara (JP)

( * ) Notice: Subject to any disclaimer, the term of this patent is extended or adjusted under 35 U.S.C. 154(b) by 907 days.

(21) Appl. No.: 13/881,104

(22) PCT Filed: Oct. 14, 2011

(86) PCT No.: PCT/JP2011/073616
§ 371 (c)(1),
(2), (4) Date: Apr. 23, 2013

(87) PCT Pub. No.: WO2012/056902
PCT Pub. Date: May 3, 2012

(65) Prior Publication Data
US 2013/0209190 A1 Aug. 15, 2013

(30) Foreign Application Priority Data
Oct. 27, 2010 (JP) .................................. 2010-240684

(51) Int. Cl.
*B23Q 11/00* (2006.01)
*B23Q 11/08* (2006.01)
(Continued)

(52) U.S. Cl.
CPC ............ *B23Q 11/0046* (2013.01); *B23C 9/00* (2013.01); *B23Q 11/08* (2013.01);
(Continued)

(58) Field of Classification Search
CPC ............ B23C 2230/00; B23C 2230/04; B23C 2230/045; B23Q 11/0042; B23Q 11/0046;
(Continued)

(56) References Cited

U.S. PATENT DOCUMENTS 2,041,689 A * 5/1936 Baumeister ........ B23Q 11/0046
173/60
4,101,238 A * 7/1978 Reibetanz ............. B23B 51/042
408/204
(Continued)

FOREIGN PATENT DOCUMENTS

| CN | 1496295 | 5/2004 |
| CN | 101234473 | 8/2008 |

(Continued)

OTHER PUBLICATIONS

MatWeb, "416 Stainless Steel," Jun. 23, 2016.*
(Continued)

*Primary Examiner* — Erica E Cadugan
*Assistant Examiner* — Michael Vitale
(74) *Attorney, Agent, or Firm* — Smith, Gambrell & Russell, LLP

(57) ABSTRACT

A cutting tool cover set to a cutting tool which includes a hollow shaft body and at least one insert attached to an end face of the shaft body and cuts by bringing the insert into contact with a work while rotating the shaft body. The cutting tool cover includes: a body portion fixed to a top end portion of the shaft body; and an extension portion extended outward from the circumferential edge of the body portion
(Continued)

in the entire circumference of the top end portion of the body portion to cover the surface of the work.

23 Claims, 16 Drawing Sheets

(51) Int. Cl.
  *B23Q 9/00* (2006.01)
  *B23C 9/00* (2006.01)
  *B23Q 3/157* (2006.01)
(52) U.S. Cl.
  CPC ....... *B23B 2270/30* (2013.01); *B23B 2270/62* (2013.01); *B23C 2226/27* (2013.01); *B23C 2230/045* (2013.01); *B23Q 3/1574* (2013.01); *Y10T 407/11* (2015.01); *Y10T 409/30392* (2015.01); *Y10T 409/304088* (2015.01)
(58) Field of Classification Search
  CPC . Y10T 409/304088; Y10T 409/304144; B23B 2270/30; B23B 2270/62
  USPC .................................. 409/137, 138; 408/67
  See application file for complete search history.

(56) References Cited

U.S. PATENT DOCUMENTS

| | | | | |
|---|---|---|---|---|
| 4,340,326 | A * | 7/1982 | Buonauro | B23B 49/001 250/559.4 |
| 6,079,078 | A * | 6/2000 | Byington | B23Q 11/0046 144/252.1 |
| 6,533,047 | B2 * | 3/2003 | Kleine | B23B 51/06 173/198 |
| 6,640,854 | B2 * | 11/2003 | Kalmbach | B23C 3/12 144/218 |
| 6,811,476 | B2 * | 11/2004 | Ohlendorf | B24B 55/102 451/359 |
| 7,175,371 | B2 * | 2/2007 | Vidal | B23Q 11/0064 408/1 R |
| 8,096,737 | B2 | 1/2012 | Tada et al. | |
| 8,622,661 | B2 | 1/2014 | Inamasu | |
| 2004/0083868 | A1 | 5/2004 | Ohmiya | |
| 2010/0166510 | A1 * | 7/2010 | Inamasu | B23C 5/10 407/11 |
| 2010/0172706 | A1 * | 7/2010 | Wirth, Jr. | B23B 49/005 408/224 |

FOREIGN PATENT DOCUMENTS

| | | |
|---|---|---|
| CN | 10175858249 | 6/2010 |
| DE | 2913501 A1 | 10/1980 |
| DE | 3143847 A1 | 5/1983 |
| DE | 10257635 A1 | 8/2004 |
| FR | 2909018 A1 | 5/2008 |
| JP | S63-144931 A | 6/1988 |
| JP | 03281114 A * | 12/1991 |
| JP | 06143086 A * | 5/1994 |
| JP | 10-29129 A | 2/1998 |
| JP | 2002166320 A * | 6/2002 |
| JP | 2004-223894 A | 8/2004 |
| JP | 2006-341326 A | 12/2006 |
| JP | 2008-100296 A | 5/2008 |
| JP | 2009-196018 | 9/2009 |
| JP | 2009-274147 A | 11/2009 |
| WO | WO 2006102522 A2 * | 9/2006 |

OTHER PUBLICATIONS

International Search Report for Application No. PCT/JP2011/073616 dated Dec. 13, 2011.
Extended European Search Report dated Mar. 7, 2014 for EP Publication No. 2633933.
PCT International Preliminary Report on Patentability (Form PCT/IB/373) dated Apr. 30, 2013 for Application No. PCT/JP2011/073616 (in Japanese).
PCT Written Opinion of the International Searching Authority (Form PCT/ISA/237) dated Dec. 13, 2011 for Application No. PCT/JP2011/073616 (in Japanese).
English translation of PCT International Preliminary Report on Patentability (Form PCT/IB/373) dated May 14, 2013 for Application No. PCT/JP2011/073616.
English translation of the PCT Written Opinion of the International Searching Authority (Form PCT/ISA/237) dated Dec. 13, 2011 for Application No. PCT/JP2011/073616.

* cited by examiner

US 9,937,598 B2

COVER FOR CUTTING TOOL, HOLDER FOR CUTTING, AND CUTTING DEVICE

TECHNICAL FIELD

The present invention relates to a cutting tool cover, a cutting holder, and a cutting apparatus and specifically relates to a cutting tool cover, a cutting holder, and a cutting apparatus used for cutting the surfaces of FRP and the like.

BACKGROUND ART

Heretofore, there is known a cutting apparatus that includes a suction port provided on the axial center of a cutting tool for the purpose of collecting chips generated in the process of cutting metal or the like, for example, and sucks and collects the chips through the suction port (see patent literature 1, for example). In recent years, fiber reinforced plastics (FRP) are cut in some cases. Chips of FRP, which are finer than metal chips, can be scattered around the cutting tool. Accordingly, some techniques have been developed in which a cover is provided to prevent chips from being scattered around the cutting tool.

CITATION LIST

Patent Literature

Patent Literature 1: Japanese Patent Laid-open Publication No. 2009-274147

SUMMARY OF THE INVENTION

Problems to be Solved by the Invention

By the way, during the process of cutting, inserts of the cutting tool and a work to be cut are in contact with each other, but there is a need to provide a gap between the cover and the work. This gap allows a small amount of chips to scatter around the cutting tool even if the cutting tool is provided with a cover. Moreover, cutting heat generated in the process of cutting accumulates in a body of the cutting tool to promote an increase in temperature at the contacts between the cutting edges of the inserts and the work (FRP). Because of the influence thereof, delamination can occur in the FRP substrate in some cases.

Accordingly, an object of the present invention is to prevent chips from being scattered, and another object of the present invention is to effectively cool the heat accumulating in the tool body to prevent an increase in temperature of inserts at the process of cutting.

Means for Solving Problems

The invention described in claim 1 is a cutting tool cover set to a cutting tool which includes a hollow shaft body and at least one insert attached to an end face of the shaft body and cuts by bringing the insert into contact with a work while rotating the shaft body, the cutting tool cover comprising:

a body portion fixed to a top end portion of the shaft body; and an extension portion extended outward from the circumferential edge of the body portion in the entire circumference of the top end portion of the body portion and covers the surface of the work.

The invention described in claim 2 is the cutting tool cover according to claim 1, wherein a face of the body portion and extension portion that faces the work is a plane parallel to a plane orthogonal to the axis of rotation of the shaft body.

The invention described in claim 3 is the cutting tool cover according to claim 1, wherein the face of the body portion and extension portion that faces the work is a tapered surface that gradually separates from the work as the distance from the outer circumference decreases.

The invention described in claim 4 is the cutting tool cover according to claim 1, wherein the face of the body portion and extension portion that faces the work is a tapered surface that gradually approaches the work as the distance from the outer circumference decreases.

The invention described in claim 5 is a cutting holder, comprising:

a cutting tool which includes a hollow shaft body and at least one insert attached to an end face of the shaft body and cuts by bringing the insert into contact with a work while rotating the shaft body; and a cutting tool cover set to the cutting tool, wherein the cutting tool cover includes:

a body portion fixed to a top end portion of the shaft body; and an extension portion extended from the circumferential edge of the body portion in the entire circumference of the top end portion of the body portion and covers the surface of the work.

The invention described in claim 6 is the cutting holder according to claim 5, wherein a face of the body portion and extension portion that faces the work is a plane parallel to a plane orthogonal to the axis of rotation of the shaft body.

The invention described in claim 7 is the cutting holder according to claim 5, wherein the face of the body portion and extension portion that faces the work is a tapered surface that gradually separates from the work as the distance from the outer circumference decreases.

The invention described in claim 8 is the cutting holder according to claim 5, wherein the face of the body portion and extension portion that faces the work is a tapered surface that gradually approaches the work as the distance from the outer circumference decreases.

The invention described in claim 9 is a cutting apparatus, comprising:

a cutting tool that includes: a hollow shaft body; and at least one insert attached to an end face of the shaft body and cuts by bringing the insert into contact with a work while rotating the shaft body;

a cutting tool cover set to the cutting tool; and a suction unit that sucks chips generated by cutting with the cutting tool through the hollow portion of the cutting tool, wherein the cutting tool cover includes:

a body portion fixed to a top end portion of the shaft body; and an extension portion extended from the circumferential edge of the body portion in the entire circumference of the top end portion of the body portion and covers the surface of the work.

The invention described in claim 10 is the cutting apparatus according to claim 9, wherein a face of the body portion and extension portion that faces the work is a plane parallel to a plane orthogonal to the axis of rotation of the shaft body.

The invention described in claim 11 is the cutting apparatus according to claim 9, wherein the face of the body portion and extension portion that faces the work is a tapered surface that gradually separates from the work as the distance from the outer circumference decreases.

The invention described in claim 12 is the cutting apparatus according to claim 9, wherein the face of the body portion and extension portion that faces the work is a tapered surface that gradually approaches the work as the distance from the outer circumference decreases.

Effects of the Invention

According to the present invention, the cutting tool cover includes the extension portion in the entire circumference of the top end part of the body portion, the extension portion being extended outward from the circumferential edge of the body portion and being configured to cover the surface of the work. Accordingly, even if chips are discharged from the cutting edge of the insert toward the outer circumference, the discharged chips can be stopped by the extension portion.

Moreover, while the suction through the hollow portion of the cutting tool is being performed, the flow of air due to the suction reaches the hollow portion through a clearance between the extension portion and the work. Accordingly, even if the chips discharged from the cutting edge of the insert try to move toward the outer circumference, the movement of the chips is restrained by the flow of air due to the suction. The chips can be therefore prevented from being scattered.

Furthermore, by providing the extension portion, the surface area of the cutting tool cover can be increased. It is therefore possible to effectively cool the heat accumulating in the tool body and prevent an increase in temperature of the insert in the process of cutting.

MODES FOR CARRYING OUT THE INVENTION

Hereinbelow, a description is given of the best mode for carrying out the present invention with reference to the drawings. The embodiment described below includes various technically preferable limitations to carryout the invention, but the scope of the invention is not limited to the following embodiment and shown examples.

Figure 1:
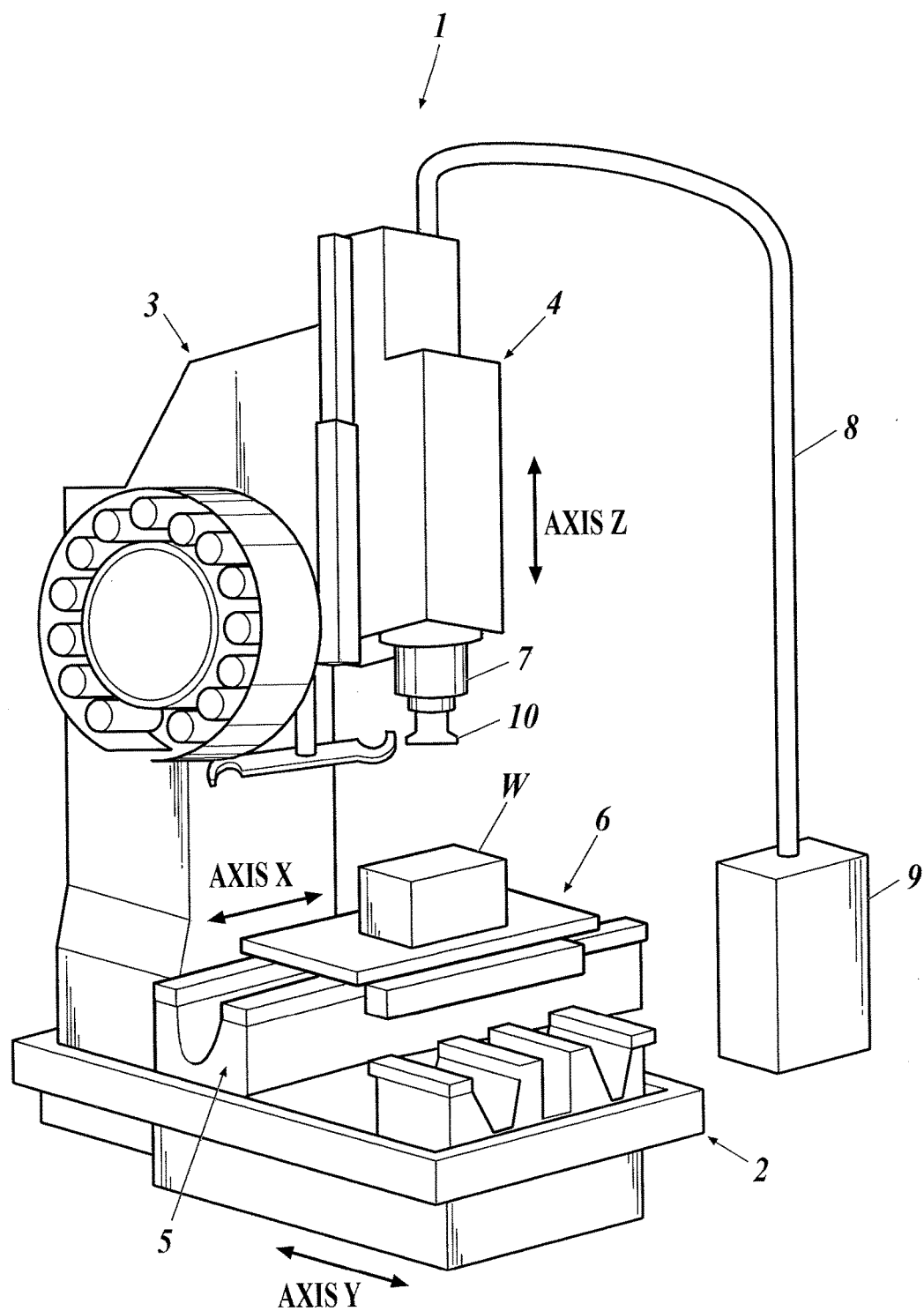
FIG. 1 is a perspective view showing a schematic configuration of a cutting apparatus according to an embodiment of the present invention.

FIG. 1 is a perspective view showing the schematic configuration of a cutting apparatus according to the embodiment. As shown in FIG. 1, the cutting apparatus 1 includes: a bed 2; a column 3 stood on rear part of the bed 2; a main shaft head 4 supported on the front surface of the column 3 so as to move in the vertical direction (in an Z-axis direction); a saddle 5 supported on front part of the bed 2 so as to move in the front-back direction (in an Y-axis direction); and a table 6 supported on the saddle 5 so as to move in the right-left direction (in an X-axis direction). On the table 6, a work W as an object to be cut, which is made of FRP or the like, for example, is placed.

In the main shaft head 4, a main shaft 7 is rotatably supported. The main shaft 7 is rotatably driven by a driving motor (not shown) which is incorporated in the main shaft head 4. At the lower end of the main shaft 7, a detachable cutting holder 10 can be attached. At the top of the main shaft head 4, a tube 8 communicating with the cutting holder 10 is provided. The other end of the tube 8 is connected to a suction unit 9 sucking chips generated by the cutting holder 10.

Next, a description is given of the cutting holder 10 in detail.

Figure 2:
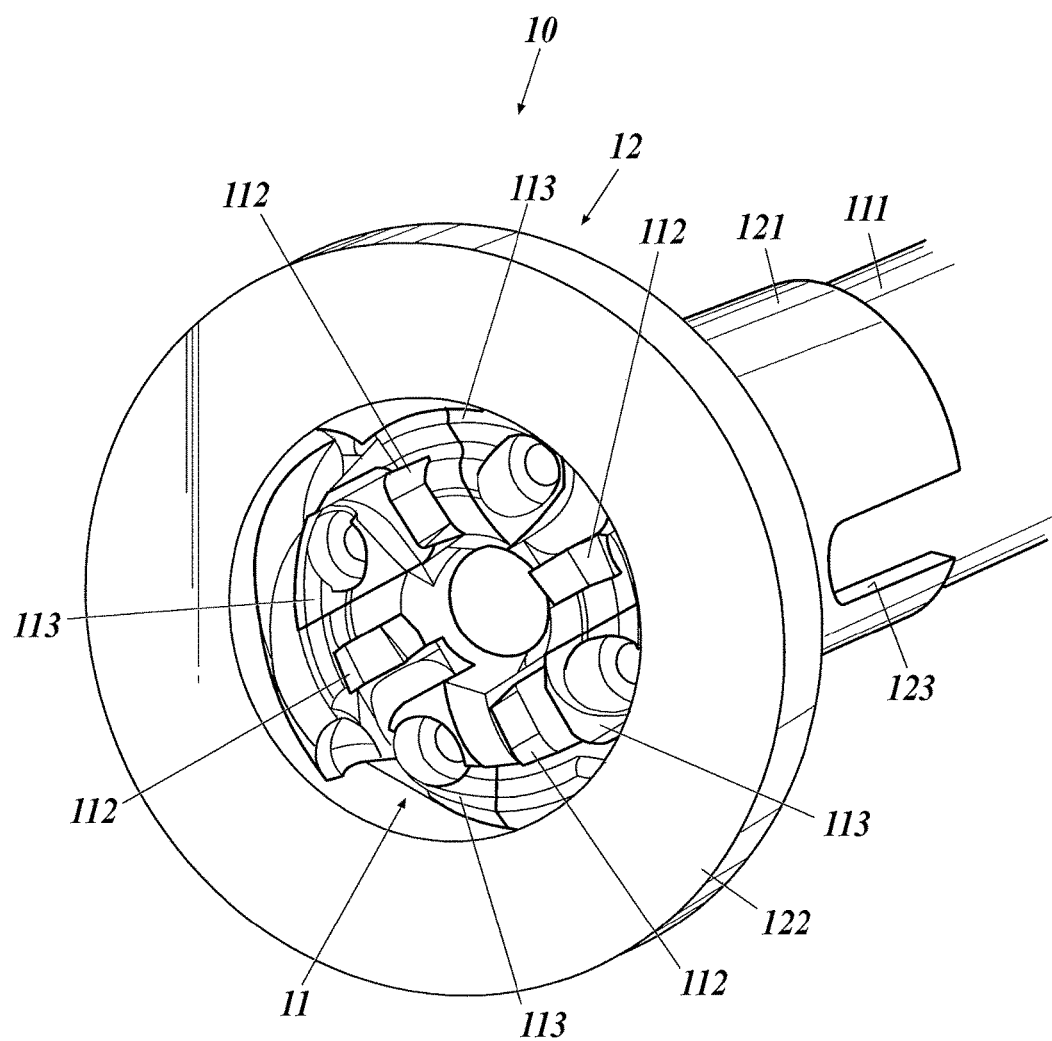
FIG. 2 is a perspective view showing a schematic configuration of a part of a cutting holder according to the embodiment.

FIG. 2 is a perspective view showing a schematic configuration of a part of the cutting holder 10. As shown in FIG. 2, the cutting holder 10 includes a cutting tool 11 for cutting the work W; and a cutting tool cover 12 set to the cutting tool 11.

Figure 3:
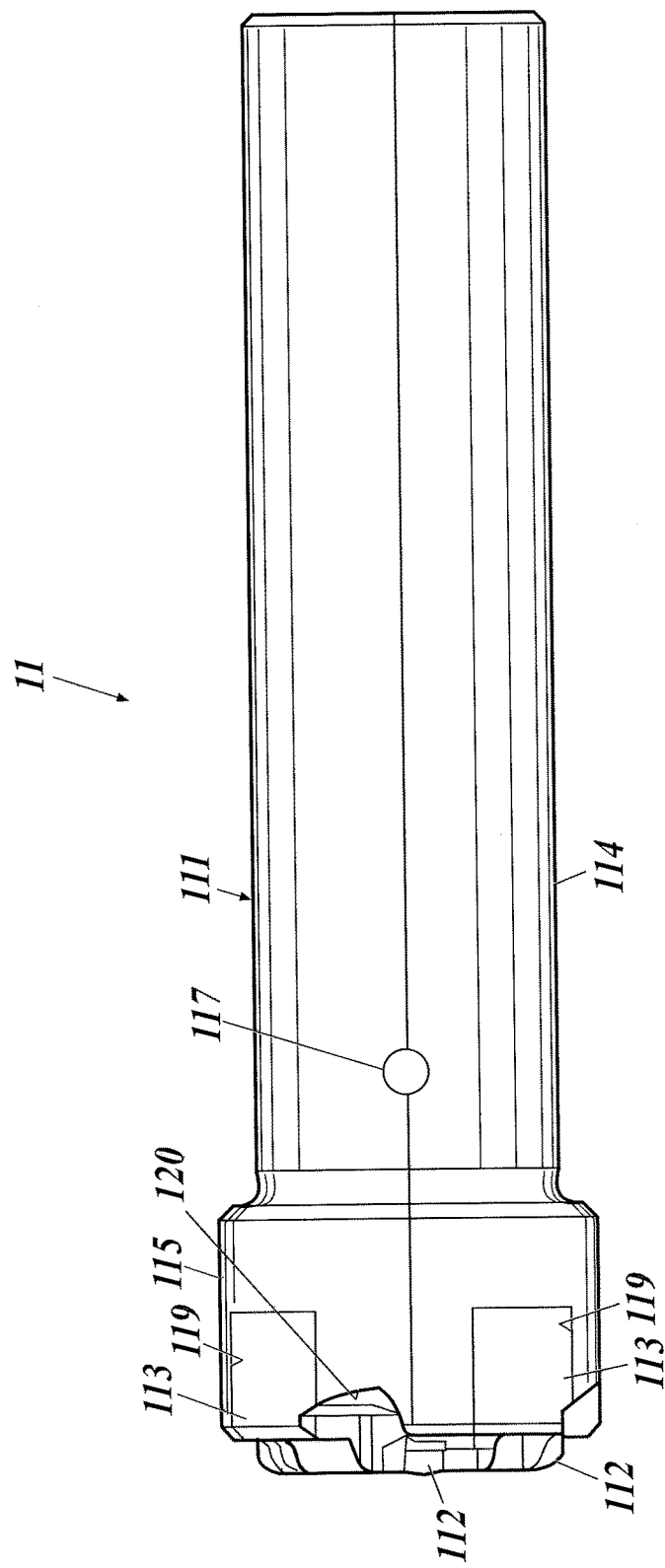
FIG. 3 is a front view showing a schematic configuration of a cutting tool according to the embodiment.
Figure 4:
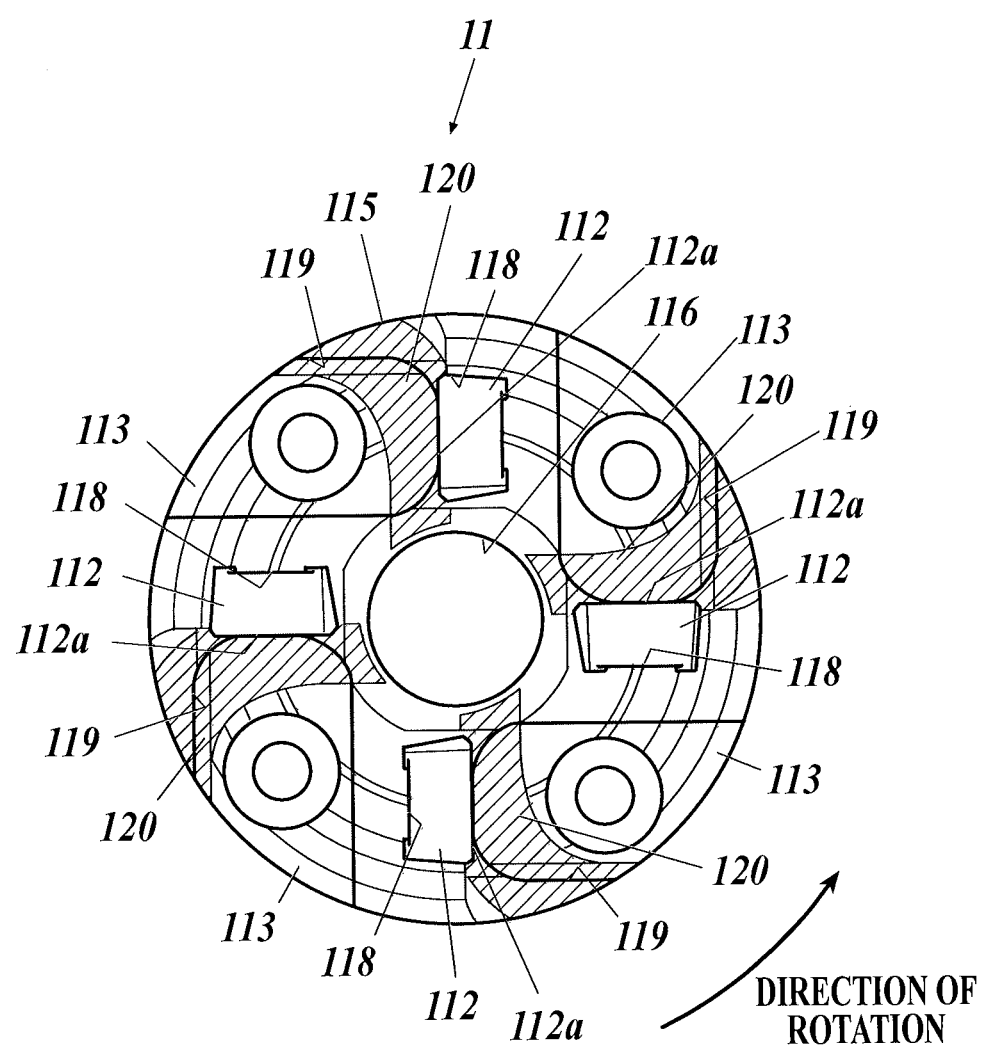
FIG. 4 is an end view showing the schematic configuration of the cutting tool according to the embodiment.
Figure 5:
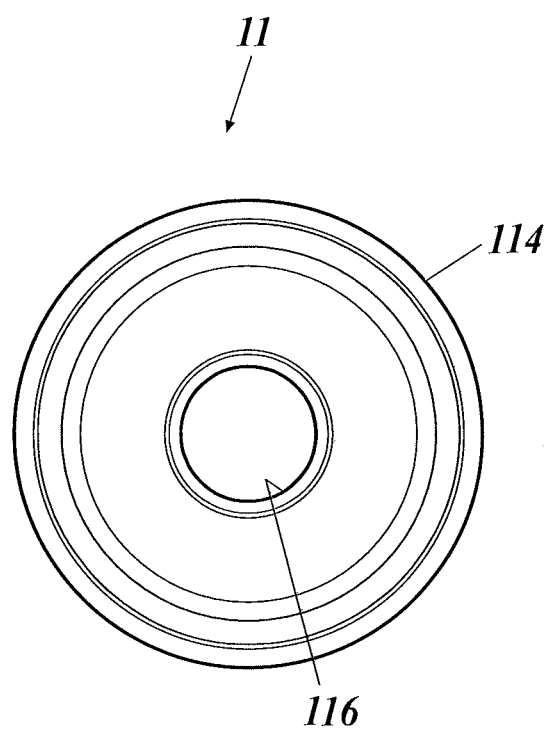
FIG. 5 is another end view showing the schematic configuration of the cutting tool according to the embodiment.

FIGS. 3 to 5 are explanatory views showing the schematic configuration of the cutting tool 11. FIG. 3 is a front view thereof; FIG. 4, an end view; and FIG. 5, another end view thereof. As shown in FIGS. 3 to 5, the cutting tool 11 includes a shaft body 111, inserts 112, and auxiliary blocks 113. The inserts 112 and auxiliary blocks 113 are provided at the top end of the shaft body 111. In the example described in this embodiment, four pairs of inserts 112 and auxiliary blocks 113 are provided. However, any number of pairs of inserts 112 and auxiliary blocks 113 may be provided.

The shaft body 111 includes: a fixed shaft 114 fixed to the main shaft head 4; and an insert fixing portion 115 provided on the top side of the fixed shaft 114. In the shaft body 111, a hollow portion 116 formed on the axial center is provided over the entire length. The end of the hollow portion 116 in the insert fixing portion 115 side is opened, and the other end of the hollow portion 116 in the fixed shaft 114 side is connected to the tube 8. That is, the hollow portion 116 communicates with the suction unit 9 through the tube 8.

In the outer circumference in top end part of the fixed shaft 114, a fixing hole 117 for fixing the cutting tool cover 12 is formed. At the top end of the insert fixing portion 115, insert attachment seats 118 on which the inserts 112 are attached and block accommodation recesses 119 accommodating the auxiliary blocks 113 are formed. The insert attachment seats 118 are located on straight lines that divide the top end surface of the insert fixing portion 115 into four parts. The block accommodation recesses 119 are located ahead of the respective insert attachment seats 118 in the direction of rotation.

The insert 112 accommodated in each insert attachment seat 118 is positioned so that a side surface 112a is substantially parallel to a plane orthogonal to the direction of rotation and faces forward in the direction of rotation. The inserts 112 accommodated in the respective insert attachment seats 118 protrude ahead from the top end of the insert fixing portion 115 so that the tip end thereof comes into contact with the work W. In other words, when the inserts 112 rotate to cut the work W, chips accumulate on the side surfaces 112a of the inserts 112.

On the other hand, in the auxiliary blocks 113 accommodated in the block accommodation recesses 119 and the insert fixing portion 115, channels 120 (shaded areas in FIG. 4) to guide air from the outer circumference to the hollow portion 116 are formed. Each channel 120 is configured to guide air so that the air passes over the side surface 112a of the insert 112.

Figure 6:
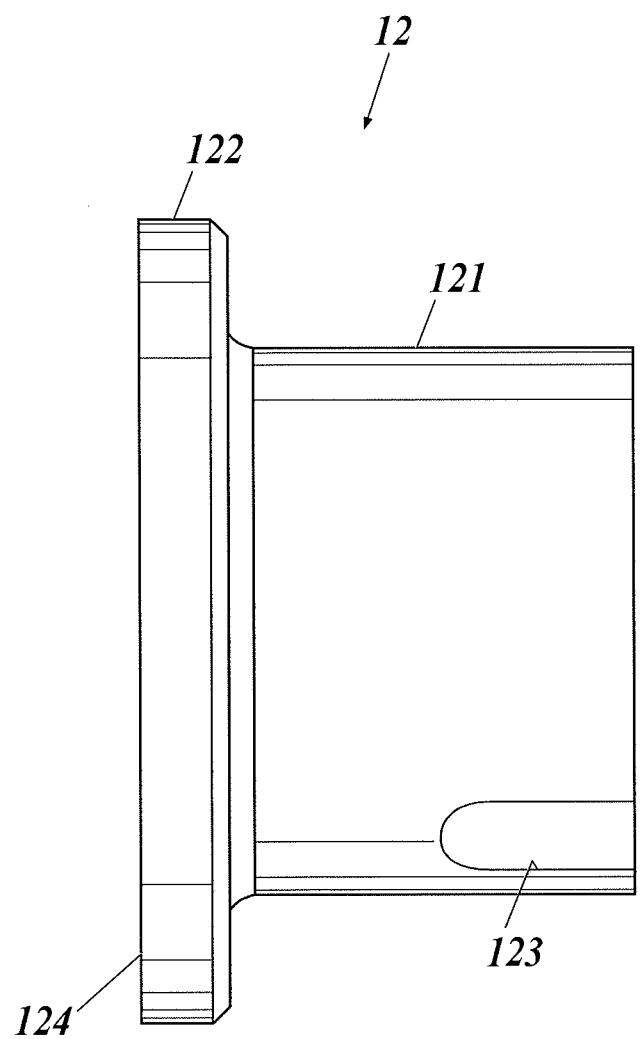
FIG. 6 is a front view showing a schematic configuration of a cutting tool cover according to the embodiment.
Figure 7:
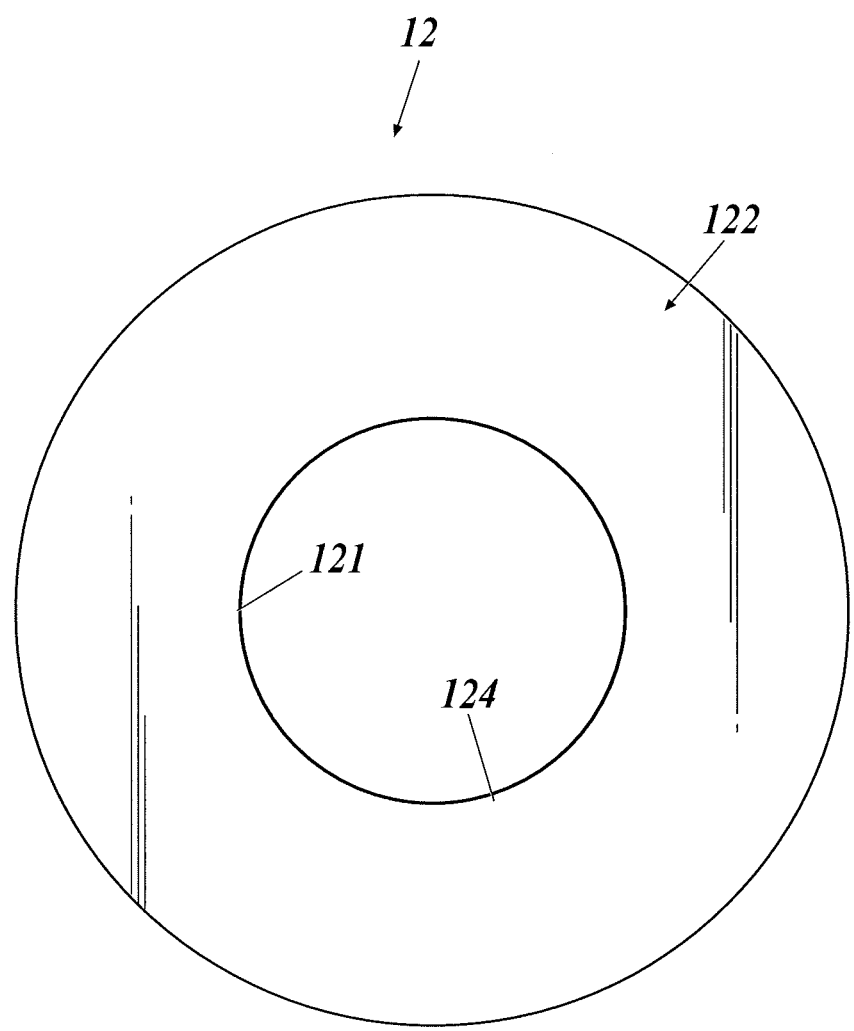
FIG. 7 is an end view showing the schematic configuration of the cutting tool cover according to the embodiment.

FIGS. 6 and 7 are explanatory views showing a schematic configuration of the cutting tool cover 12. FIG. 6 is a front view thereof, and FIG. 7 is an end view thereof. As shown in FIGS. 6 and 7, the cutting tool cover 12 includes a body portion 121 and an extension portion 122 extending outward from the circumferential edge of the body portion 121. The body portion 121 and extension portion 122 are integrally made of metal or the like.

The metal or the like constituting the body portion 121 and extension portion 122 of the cutting tool cover 12 is a material having a higher thermal conductivity than that of the cutting tool 11. Preferably, the cutting tool cover 12 is in contact with the cutting tool 11 and thermally communicates with the same. Herein, the above "thermally communicates" means that heat can be transferred from the cutting tool 11 to the cutting tool cover 12.

This allows the heat accumulating in the body of the cutting tool 11 to conduct and released to the cutting tool cover 12. Accordingly, the body of the cutting tool 11 can be effectively cooled, and the inserts 112 can be prevented from increasing in temperature in the process of cutting.

Herein, the material of the aforementioned metal or the like constituting the cutting tool cover 12 is preferably a substance selected from aluminum, aluminum alloy, copper, silver, gold, copper-tungsten alloy, and the like. The material of the cutting tool cover 12 may alternatively contain graphite in addition to metal.

As an example of the embodiment, when the material of the inserts 112 is WC-based cemented carbide with a grade in which the Co content in the bonded phase is 2 to 20 mass % and the rest thereof is composed of WC, the thermal conductivity has a value ranging from about 90 to 105 W/m·K.

If the material of the cutting tool 11 is general-purpose alloy tool steel such as SKD61, SCM435, or SCM440 material, for example, the material of the cutting tool 11 has a thermal conductivity of about 15 to 50 W/m·K. Accordingly, it is preferable that the material of the cutting tool cover 12 has a thermal conductivity twice or more of that of the cutting tool 11 for preventing accumulation of heat. The cutting tool cover 12 more preferably has a high thermal conductivity of not less than 150 W/m·K and further more preferably has a high thermal conductivity of not less than 250 W/m·K.

Accordingly, it is preferable that the material of the aforementioned metal or the like constituting the cutting tool cover 12 is a substance selected from aluminum, aluminum alloy, copper, silver, gold, copper tungsten alloy, and the like. As for the thermal conductivities (W/m·K) of these materials, aluminum (Al) has a thermal conductivity of about 237 W/m·K; copper (Cu), about 398 W/m·K; silver (Ag), about 420 W/m·K; gold (Au), about 320 W/m·K; and tungsten (W), about 178 W/m·K.

The material of the cutting tool cover 12 may alternatively contain graphite having a thermal conductivity of 119 to 165 W/m·K in addition to the above metals.

Aluminum or aluminum alloy is characterized by light weight with a density of 2.7 to 2.9 g/cm$^3$, which is about one third of the density of steel, and an excellent thermal conductivity of 237 W/m·K (the value of pure aluminum). The corrosion resistance thereof is excellent if passive film works effectively. Copper has a thermal conductivity 1.7 times and a specific gravity 3.3 times that of aluminum or aluminum alloy. Copper is more excellent in thermal conductivity than aluminum or aluminum alloy but is heavy and is high in cost.

Accordingly, the material of the cutting tool cover 12 is preferably aluminum or aluminum alloy, in the light of weight reduction, comparatively low price thereof, easy processing thereof, and the like.

By attaching the cutting tool cover 12 composed of a material with good thermal conductivity to the cutting tool 11, heat can be quickly transferred from the inserts 112 to the cutting tool cover 12 through the cutting tool 11. Accordingly, the provision of the cutting tool cover 12 can be expected to prevent accumulation of heat in the cutting tool 11 and prevent initiation of thermal crack in cutting edges of the inserts 112. The improvement in heat conductivity can improve the resistance to wear of the cutting edges of the inserts 112 and prolong the life thereof.

As shown in FIG. 1, the inserts 112 are attached to the cutting tool 11, and the cutting tool cover 12 is also attached to the cutting tool 11. The cutting tool 11 includes the insert attachment seats 118 provided for the top end of the insert fixing portion 115, and the inserts 112 are fixed to the insert attachment seats 118. The method of fixing the inserts 112 includes a fixing method using fixing members such as screws or clamping pins, for example.

The body portion 121 is substantially cylindrical and is fixed to the shaft body 111 of the cutting tool 11 to cover the insert fixing portion 115, which is a top end portion of the shaft body 111. At the base end side of the body portion 121, an engagement portion 123, which is locked with a fixing hole 117 of the fixed shaft 114, is formed. By putting this engagement portion 123 over the fixing hole 117 and screwing a not-shown screw into the fixing hole 117, the cutting tool cover 12 is attached to the cutting tool 11.

The options of the method of fixing the cutting tool cover 12, in addition to the method of screwing a screw into the fixing hole 117, include, for example, mechanical attachment methods such as fixing through a fixing member such as clamping pins, press fitting, heat fitting, metal blazing, soldering, and fixing with adhesives. Herein, preferably, the materials used in metal blazing and soldering and adhesives have a higher heat conductivity than that of the cutting tool 11.

The extension portion 122 is configured to cover the surface of the work W and is provided for the entire circumference of the top end portion of the body portion 121 so as to have a circular external circumferential profile. The size of the extension portion 122 is optimized by various types of simulations and experiments based on rotating speed at the process of cutting, and the material, size, and the like of the work W.

The face 124 of the body portion 121 and extension portion 122 that faces the work W is a plane parallel to a plane orthogonal to the axis of rotation of the shaft body 111.

Next, a description is given of the operation of the embodiment.

First, before the process of cutting, the suction unit 9 is driven to suck air from the top end of the hollow portion 116 and keeps sucking when the cutting process is started.

Figure 8:
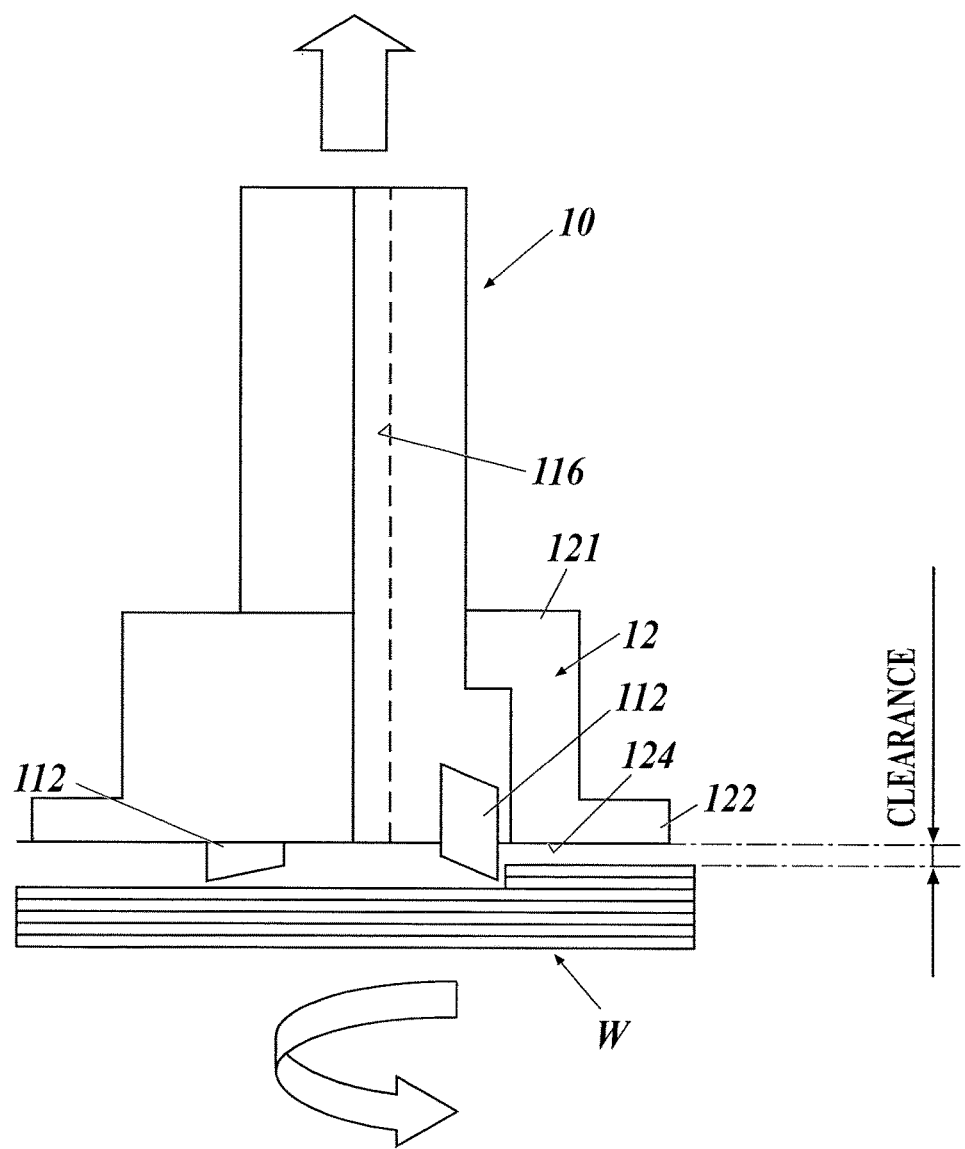
FIG. 8 is an explanatory view schematically showing the relationship between a cutting holder and a work in the process of cutting.

FIG. 8 is an explanatory view schematically showing the relationship between the cutting holder 10 and the work W in the process of cutting. In FIG. 8, the right half of the cutting holder 10 shows the internal shape. As shown in FIG. 8, the cutting processing is face milling (flattening). In this process, a clearance is provided between the surface of the work W and the cutting tool cover 12. While the suction unit 9 is sucking, airflow is generated not only in the hollow portion 116 but also between the surface of the work W and the cutting tool cover 12. Herein, the area at the inner circumference of the extension portion 122 (the diameter of the inner circumference×π×clearance) is smaller than the area at the outer circumference of the extension portion 122 (the diameter of the outer circumference×π×clearance). Accordingly, the flow rate of the airflow gradually increases as the distance from the outer circumference increases. In other words, chips discharged from the cutting edges of the inserts 112 are exposed to the higher-speed airflow and are sucked into the hollow portion 116.

As described above, according to the embodiment, the extension portion 122 is provided for the entire circumference of the top end portion of the body portion 121 of the cutting tool cover 12 so as to extend outward from the circumferential edge of the body portion 121 and cover the surface of the work W. Accordingly, even if chips are discharged from the cutting edges of the inserts 112 towards the outer circumference, the movement of chips can be restrained.

Moreover, while air is being sucked through the hollow portion 116 of the cutting tool 11, the flow of air due to the suction reaches the hollow portion 116 through the clearance between the extension portion 122 and the work W. Accordingly, even if chips discharged from the cutting edges of the inserts 112 try to move to the outside through the clearance, the airflow due to the suction prevents the chips from moving to the outside. It is therefore possible to prevent chips from being scattered.

Furthermore, by providing the extension portion 122, the surface area of the cutting tool cover 12 can be increased. It is therefore possible to effectively cool the heat accumulating in the body of the cutting tool 11 and prevent the inserts 12 from increasing in temperature in the process of cutting.

For the purpose of preventing the inserts 112 from increasing in temperature by friction at the process of cutting or effectively cooling the heat accumulating in the body of the cutting tool 11, it is preferable that the heat generated at the cutting edges of the inserts 112 by friction at the process of cutting is transferred from the inserts 112 through the body of the cutting tool 11 to the extension portion 122 of the cutting tool cover 12.

By preventing the inserts 112 from increasing in temperature by friction at the process of cutting, it is possible to reduce the heat cycle of repeatedly heating and cooling the cutting edges. This heat cycle accelerates generation and development of cracks in the cutting edges and degrades the resistance to wear and resistance to defect of the cutting edges. Accordingly, preventing the inserts 112 from increasing in temperature is effective in prolonging the life of the cutting edges.

Moreover, if the work material is a composite material such as CFRP (carbon fiber-reinforced plastic) or GFRP (glass fiber-reinforced plastic), for example, the surface of the work material is required to keep the high quality after processing. By preventing the increase in temperature of the cutting edges by friction at the process of cutting, chips of the work material can be prevented from being welded to the cutting edges.

The present invention is not limited to the aforementioned embodiment and can be properly changed. In the following description, the same portions as those of the aforementioned embodiment are given the same numerals, and the description thereof is omitted.

For example, the above-described embodiment illustrates the extension portion 122 of the cutting tool cover 12 having a circular external profile. However, the external profile of the extension portion 122 may be any shape and is preferably a point-symmetric around the axis of rotation. Examples of the point-symmetric shape around the axis of rotation, in addition to the circular shape, include a regular polygonal shape, an elliptical shape, or the like.

The cutting tool 11 and cutting tool cover 12 each can be manufactured by processing of a preferable material with NC control using a five-axis control machining center or the like.

Moreover, in the example described in the above embodiment, the face 124 of the body portion 121 and extension portion 122 of the cutting tool cover 12, which faces the work W, is a plane parallel to a plane orthogonal to the axis of rotation of the shaft body 111. However, the face 124 may have any shape as long as the face 124 can cover the surface of the work W around the cutting tool 11.

[Modification 1]

Figure 9:
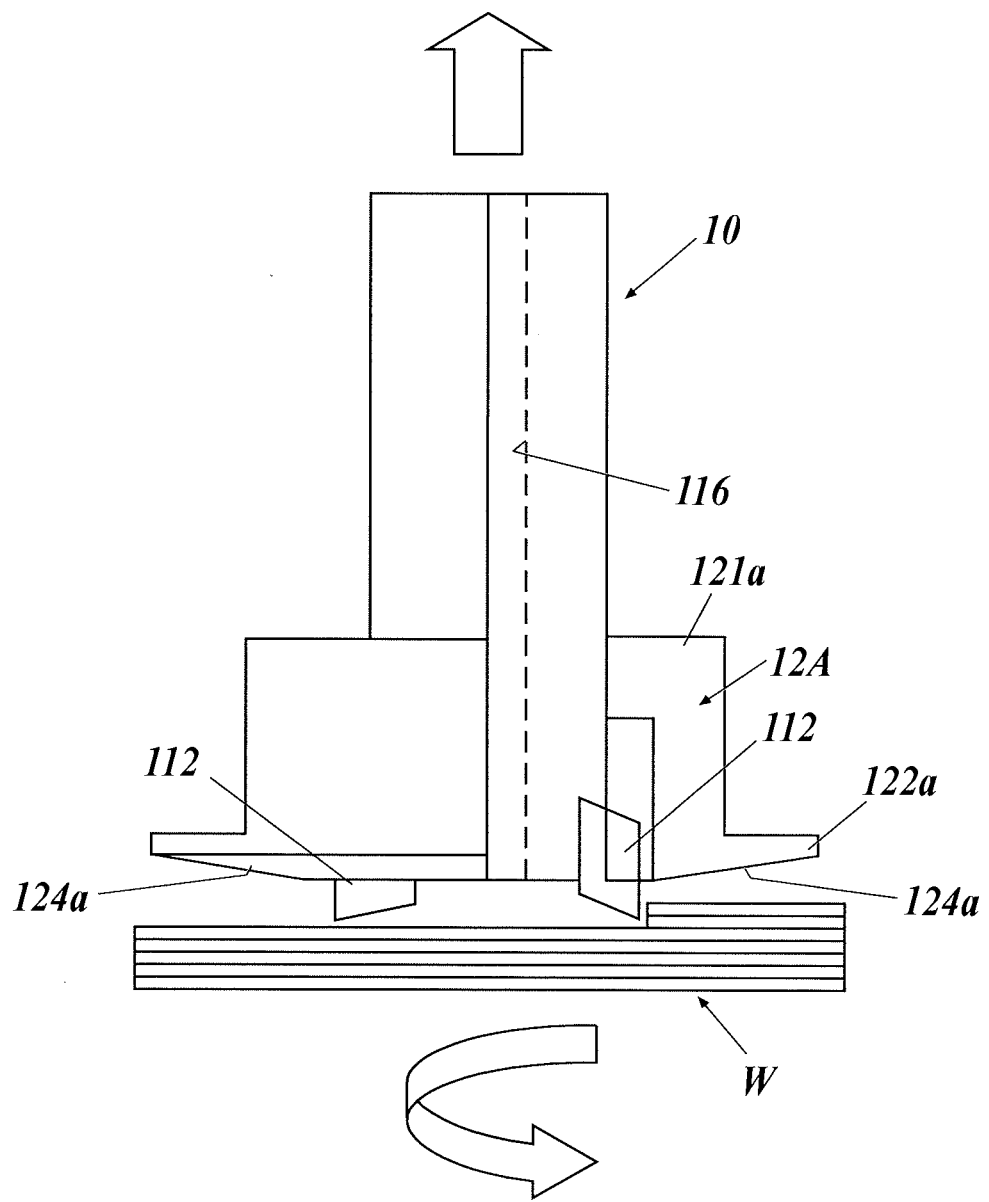
FIG. 9 is an explanatory view schematically showing Modification 1 of the cutting tool cover shown in FIG. 8.

In Modification 1, like a cutting tool cover 12A shown in FIG. 9, a face 124*a* of the body portion 121*a* and extension portion 122*a* that faces the work W is a tapered surface that gradually separates from the work W as the distance from the outer circumference decreases. In this case, the clearance between the work W and the face 124*a* gradually decreases as the distance from the outer circumference increases. This further increases the difference between the area at the inner circumference of the extension portion 122*a* (the diameter of the inner circumference×π×clearance) and the area at the outer circumference of the extension portion 122*a* (the diameter of the outer circumference×π×clearance). Compared to the case of the aforementioned embodiment, therefore, the flow rate of the airflow increases rapidly. Accordingly, chips discharged from the cutting edges of the inserts 112 are exposed to higher-rate airflow and can be sucked more reliably.

In the case of a curved surface processing, the cutting tool 11 needs to be inclined according to the curved profile of the work W. In the case of using the cutting tool cover 12 of the aforementioned embodiment, if the cutting tool 11 is inclined, the outer edge of the extension portion 122 comes into contact with the work W, and the curved surface processing itself is difficult. However, with the cutting tool cover 12A including the tapered surface that gradually separates from the work W as the distance from the outer edge decreases, even if the cutting tool 11 is inclined, there is enough space for the outer peripheral edge of the extension portion 122a to be separated from the work W. Accordingly, the curved surface processing can be easily performed.

Preferably, the angle of inclination of the tapered surface is set according to the maximum angle of inclination of the cutting tool 11 in the curved surface processing.

[Modification 2]

Figure 10:
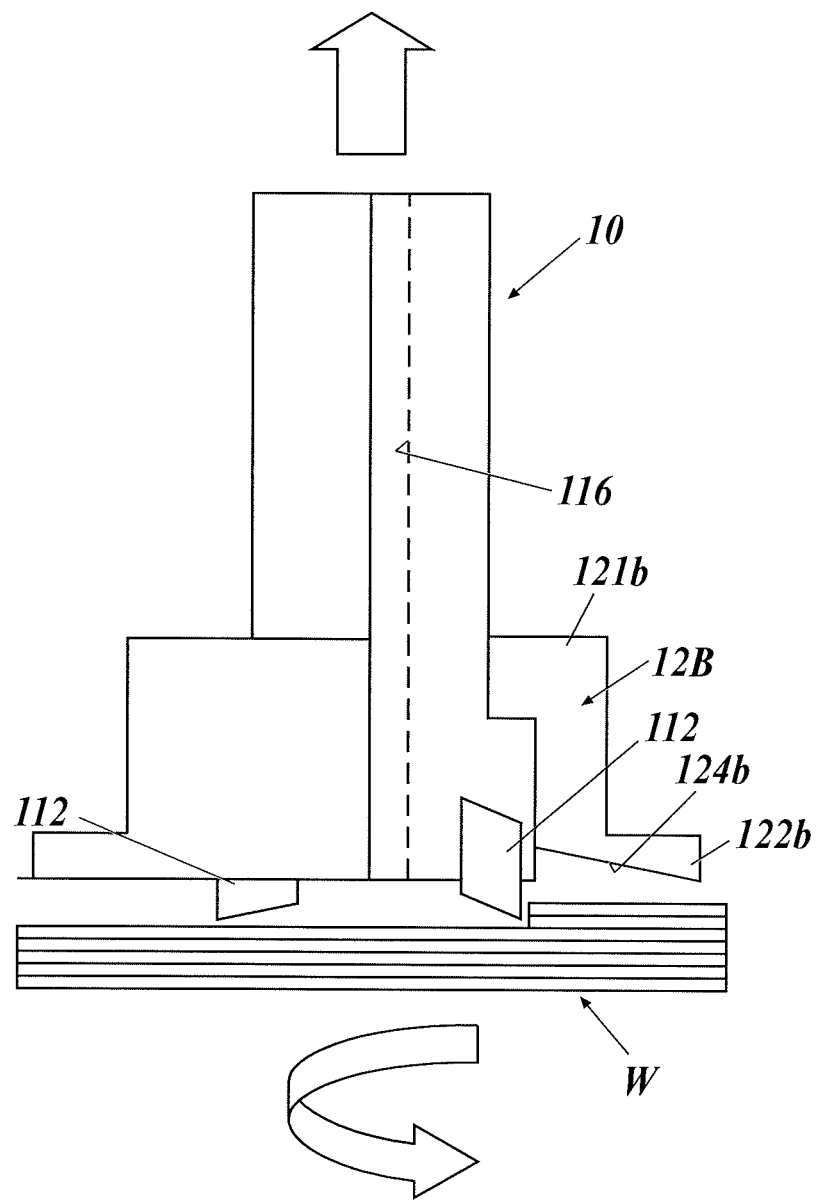
FIG. 10 is an explanatory view schematically showing Modification 2 of the cutting tool cover shown in FIG. 8.

In Modification 2, like a cutting tool cover 12B shown in FIG. 10, a face 124b of a body portion 121b and an extension portion 122b that faces the work W is a tapered surface that gradually approaches the work W as the distance from the outer edge decreases. With such a shape, even if chips discharged from the cutting edges of the inserts 112 are reflected on the face 124b, the chips can be reflected deeper to the inside than the case where the face 124 is a plane. It is therefore possible to further prevent chips from being scattered.

[Modification 3]

Figure 11:
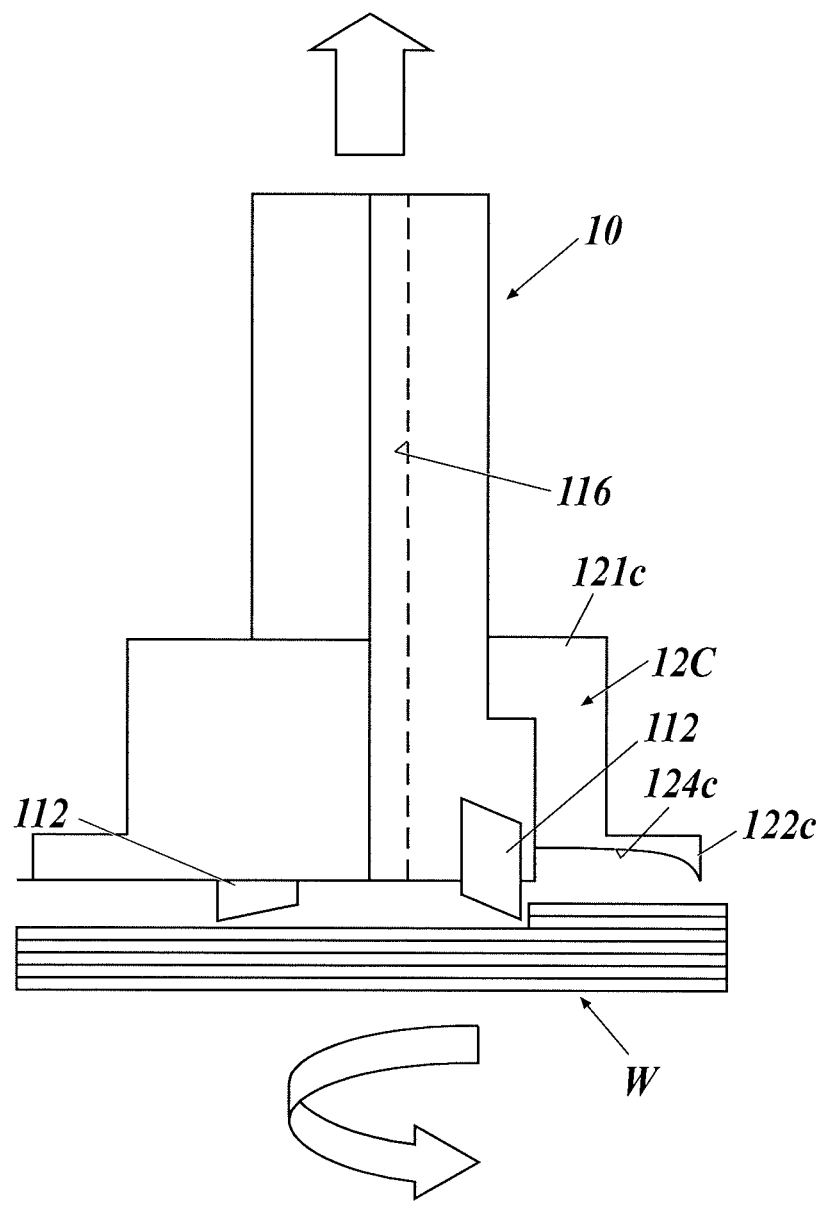
FIG. 11 is an explanatory view schematically showing Modification 3 of the cutting tool cover shown in FIG. 8.

In Modification 3, like a cutting tool cover 12C shown in FIG. 11, a face 124c of a body portion 121c and an extension portion 122c that faces the work W is a paraboloidal surface that gradually approaches the work W as the distance from the outer edge decreases. With such a shape, even if chips discharged from the cutting edges of the inserts 112c are reflected on the face 124c, the chips can be reflected deeper to the inside than the case where the face 124c is a plane. It is therefore possible to further prevent chips from being scattered.

Moreover, in order to increase the heat release efficiency, it is preferable that groove-like fins are formed on the surface of the cutting tool cover 12 to increase the surface area. Preferably, fins are provided side by side at substantially regular intervals on the surface of the extension portion 122 of the cutting tool cover 12, for example. Between the adjacent fins, the grooves are individually formed. Accordingly, air passes through the grooves to suitably cool the cutting tool 11 through the cutting tool cover 12.

[Modification 4]

Figure 12:
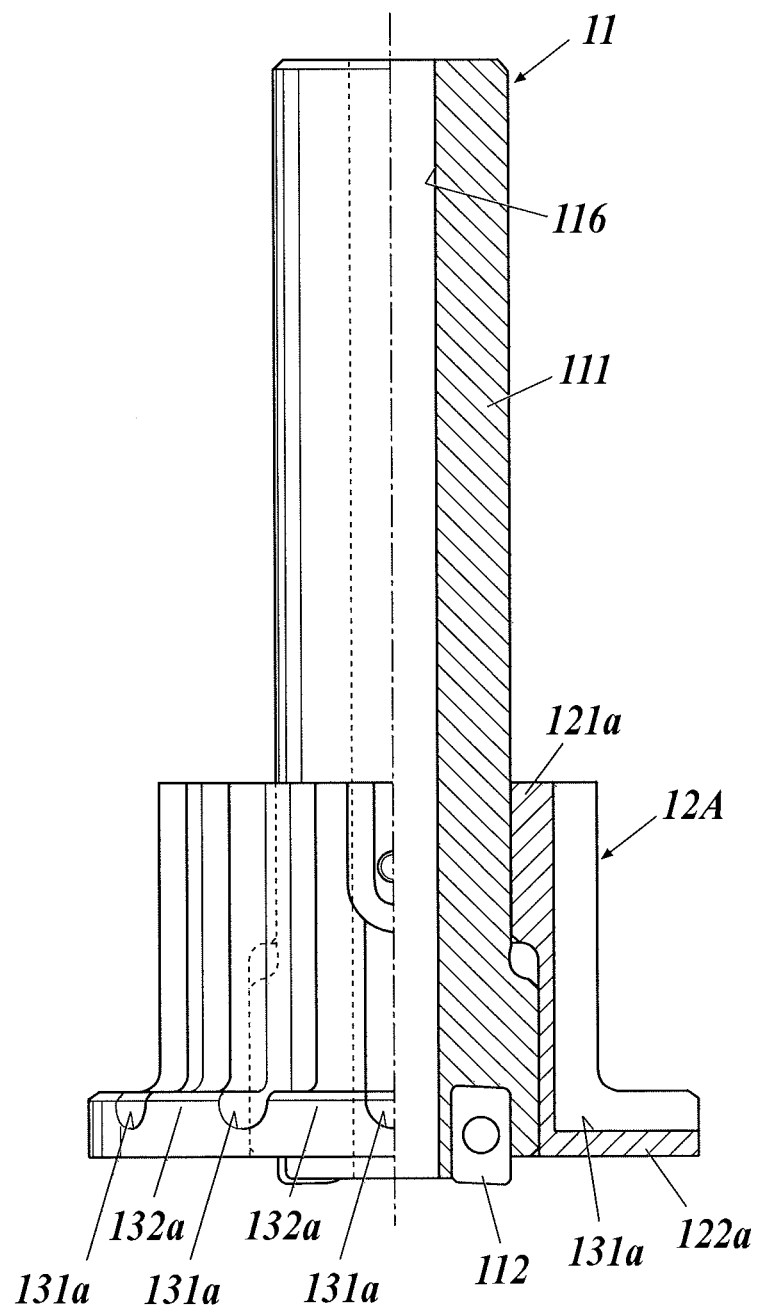
FIG. 12 is a partial cross-sectional view schematically showing Modification 4 of the cutting tool cover according to the embodiment.

FIG. 12 is a partial cross-sectional view showing an example of the cutting tool cover including fins. As shown in FIG. 12, on the outer circumferential surface of a cutting tool cover 12A, a plurality of grooves 131a extending from the body portion 121a to the extension portion 122a along the axis direction are formed at substantially regular intervals in the circumferential direction. Each groove 131a has an L-shaped cross-section. These plural grooves 131a form fins 132a.

[Modification 5]

Figure 13:
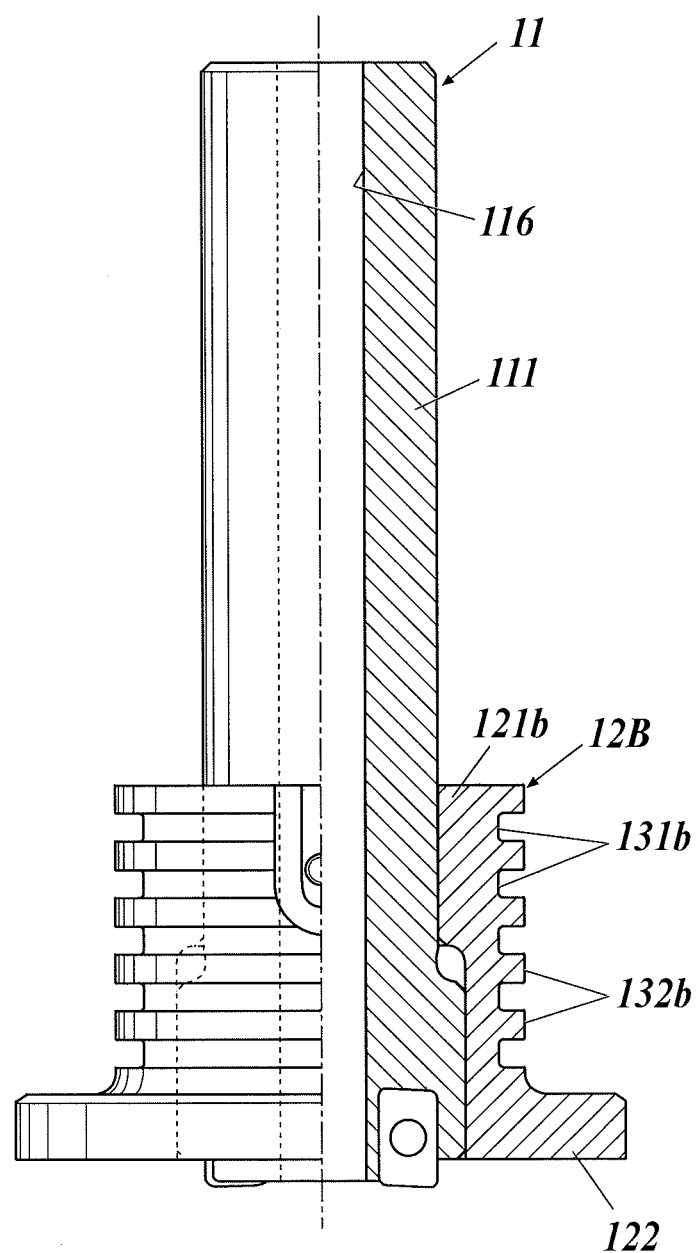
FIG. 13 is a partial cross-sectional view schematically showing Modification 5 of the cutting tool cover according to the embodiment.

FIG. 13 is a partial cross-sectional view showing another example of the cutting tool cover having fins. As shown in FIG. 13, on the outer circumferential surface of a body portion 121b in a cutting tool cover 12B, plural grooves 131b concentric to the rotational axis are formed at substantially regular intervals in the axis direction. These plural grooves 131b form fins 132b.

It is preferable that the fins are provided at regular intervals like the fins 132a and 132b for maintaining the balance of the rotating tool.

Moreover, it is preferable that the area of contact between the cutting tool cover 12 and cutting tool 11 is increased to increase the efficiency of heat conduction. As modifications with the area of contact increased, Modifications 6 and 7 are shown.

[Modification 6]

Figure 14:
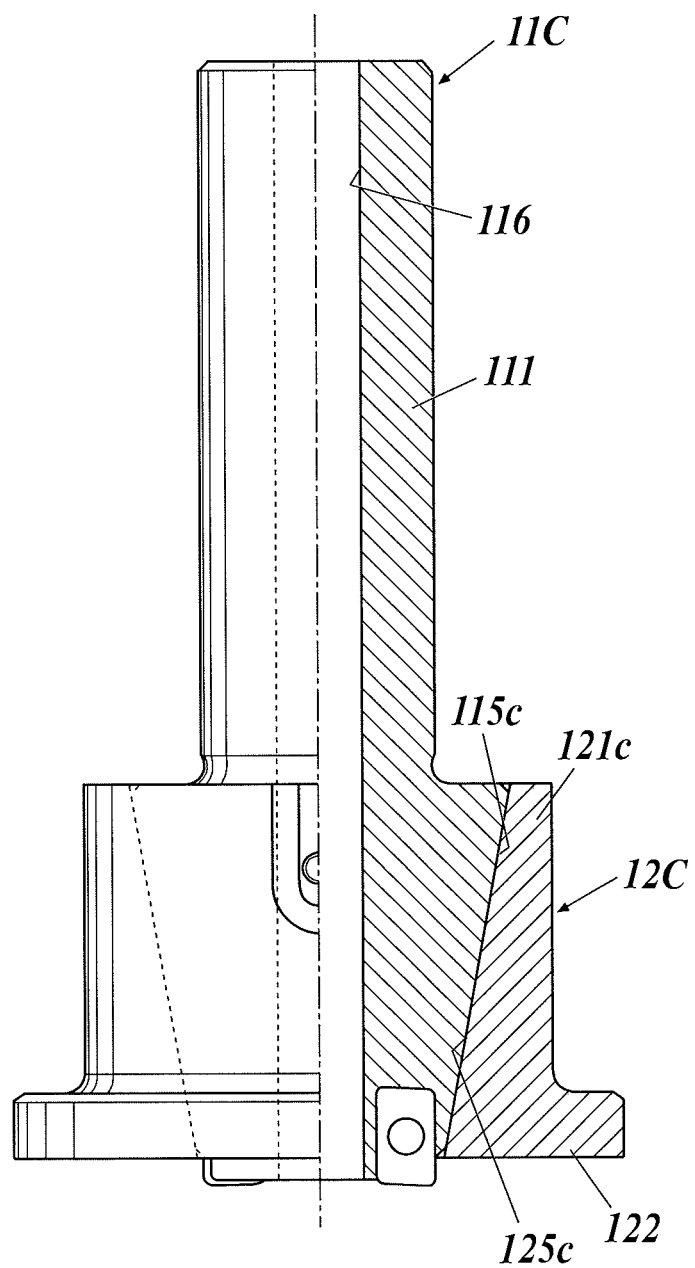
FIG. 14 is a partial cross-sectional view schematically showing Modification 6 of the cutting tool cover according to the embodiment.

In a cutting tool cover 12C and a cutting tool 11C shown in FIG. 14, the inner circumferential surface of a body portion 121c of the cutting tool cover 12C is a tapered surface 125c tapered toward the top, and the outer circumferential surface of the top portion of the cutting tool 11C is also a tapered surface 115c tapered toward the top. When the cutting tool cover 12C and cutting tool 11C are assembled to each other, the tapered surfaces 115c and 125c are laid on each other to allow heat conduction.

[Modification 7]

Figure 15:
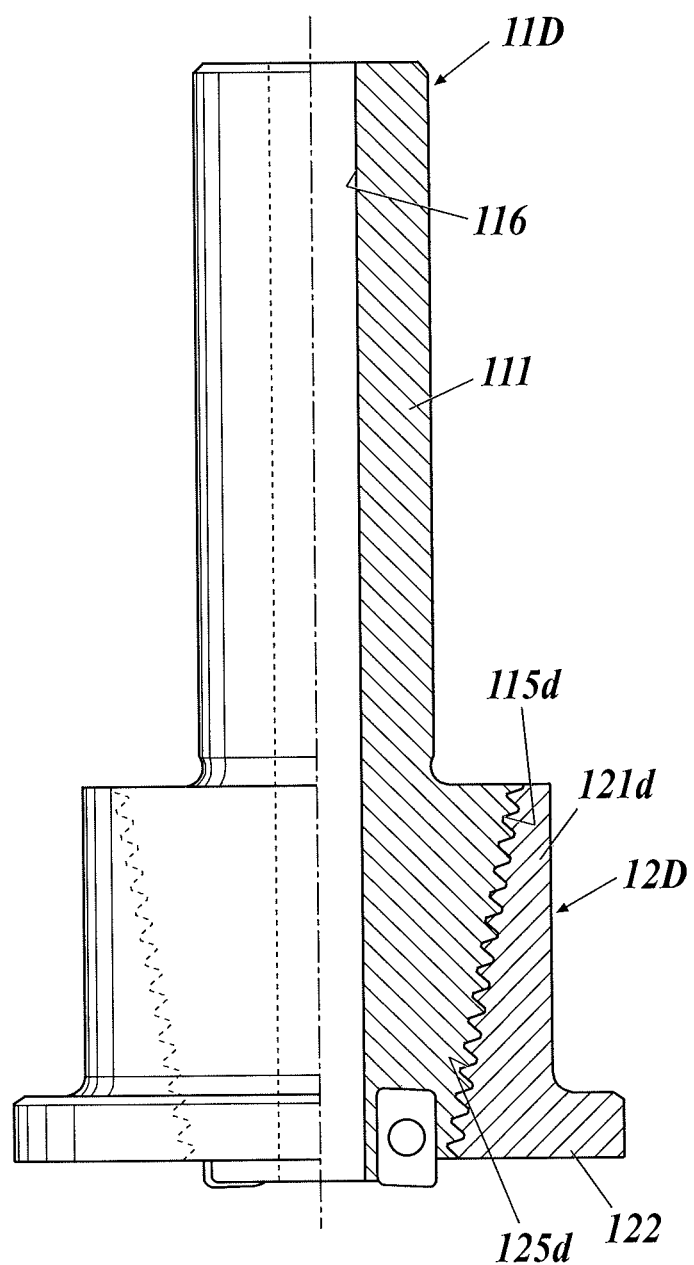
FIG. 15 is a partial cross-sectional view schematically showing Modification 7 of the cutting tool cover according to the embodiment.

In a cutting tool cover 12D and a cutting tool 11D shown in FIG. 15, the inner circumferential surface of a body portion 121d of the cutting tool cover 12D is composed of a female thread 125d, and the outer circumferential surface of the top portion of the cutting tool 11D is composed of a male thread 115d. When the cutting tool cover 12D and cutting tool 11D are screwed to each other, the female and male threads 125d and 115d come into close contact with each other to allow heat conduction.

EXAMPLE

Hereinafter, a description is given of the embodiment of the present invention in detail with an example. The present invention is not limited to the following example.

The cutting tool holder 10 according to the present invention was made for a cutting test and was simultaneously subjected to evaluation of the suction efficiency at sucking chips. In this test, it was confirmed that the cutting tool holder 10 of the present invention prevented chips from being scattered in the process of cutting.

The cutting tool holder 10 according to the present invention includes the cutting tool 11 and the cutting tool cover 12 attached to the cutting tool 11 as shown in FIGS. 2 to 7.

The base material of the experimentally produced cutting tool 11 was alloy tool steel equivalent to SCM440 and had the external profile shaped by a turning process. The product was well-tempered to have a surface hardness of 40 to 43 HRC, and then the surface thereof attached to the cutting tool cover 12 was finished by polishing. The bore surfaces and sidewall surfaces as the insert fixing portion 115 of the cutting tool 11 were formed by a milling process with a machining center. Furthermore, the screw fixing hole 117 for fixing the cutting tool cover 12 was formed.

The base material of the cutting tool cover 12 was aluminum metal material and had the external profile shaped by a turning process. The diameter of the outer circumference of the extension portion 122 of the cutting tool cover 12 was about twice the tool blade diameter of the cutting tool 11. Moreover, as shown in FIG. 8, the face 24 of the cutting tool cover 12 that faces the work W was a plane parallel to a plane orthogonal to the axis of rotation of the tool so that the clearance between the cutting tool cover 12 and the work was maintained.

The four inserts attached to the cutting tool 11 were entirely made of cemented carbide, including the cutting edges. The surfaces of all the inserts were coated with a diamond coating.

A description is given of the method and results of the cutting test below.

[Work Material Cutting Test]

In the cutting test, the cutting tool and an NC machine were used to perform a face milling process for the work material, and the suction efficiency was evaluated. In the face milling test, cutting process is performed using an example including the cutting tool cover 12 attached to the cutting tool 11 and a comparative example including only the cutting tool 11 with the cutting tool cover 12 not attached.

The material of the cut material used in this cutting test was carbon fiber-reinforced plastic (CFRP), and the cutting test was performed by a face milling process of this cut material.

Herein, as for the method of calculating the suction efficiency, the ratio (W2/W1) of weight W2 (g) of chips collected after the cutting test by the suction unit 9 of FIG. 1 to the weight W1 (W1) of the cut material calculated by the volume of the cut material cut and removed was calculated as the suction efficiency. In this cutting test, the value of W1 was set to 311 (g).

Hereinbelow, the contents and results of the cutting test were described. The cutting conditions of the cutting test are shown below.

Figure 16:
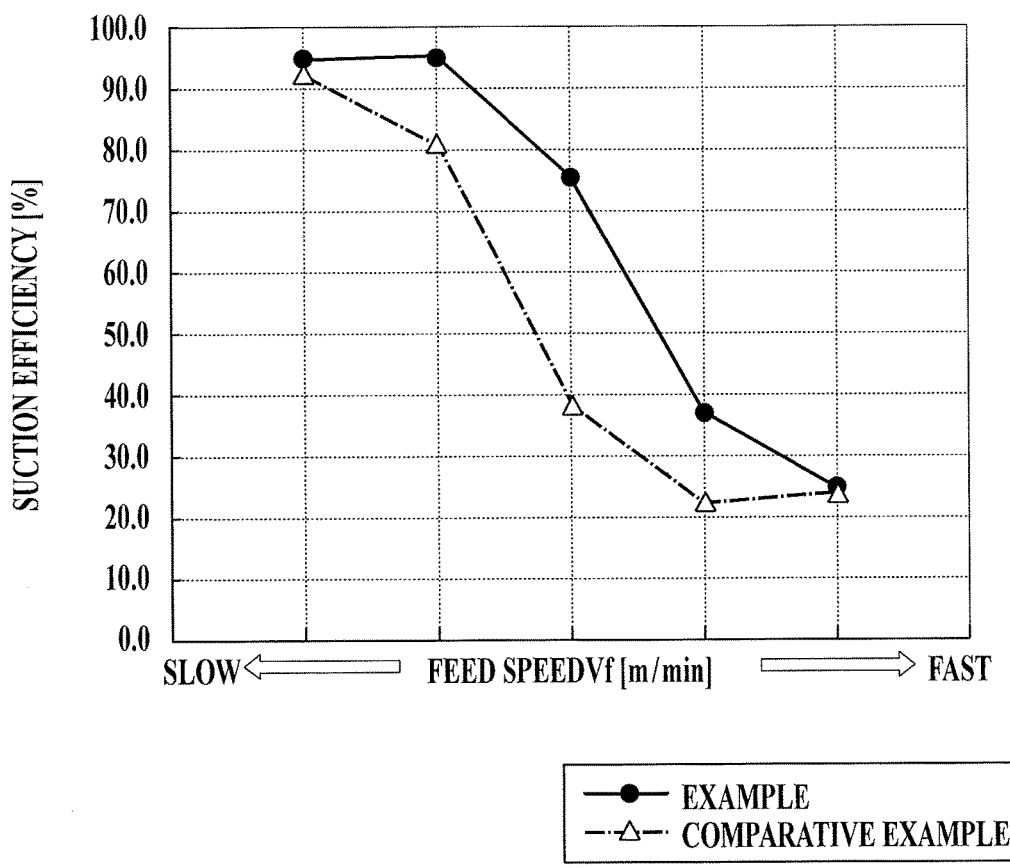
FIG. 16 is a graph showing results of a cutting test of an example and a comparative example.

<Cutting Conditions>
Machining Method: face milling, dry machining
Revolutions n: 2000 to 10000 $\text{min}^{-1}$ FIG. 16 is a graph showing the results of the cutting test for the example of the present invention and comparative example. In FIG. 16, the graphs of the example and comparative examples show the tendencies in which the suction efficiency drops as the feed speed Vf increases. Especially when the feed speed Vf is moderate, the suction efficiency of the example was 75.3%, and the suction efficiency of the comparative example was 38.6%. The difference therebetween was maximized with 36.7 points. Accordingly, it could be confirmed that according to the present invention, the efficiency of sucking chips was about doubled and considerably improved and the cutting tool of the present invention can prevent chips from being scattered in the process of cutting.

On the other hand, the suction efficiencies of the examples and comparative examples were substantially the same when the feed speed Vf was extremely slow or fast.

EXPLANATION OF REFERENCE NUMERALS

1 CUTTING APPARATUS
2 BED
3 COLUMN
4 MAIN SHAFT HEAD
5 SADDLE
6 TABLE
7 MAIN SHAFT
8 TUBE
9 SUCTION UNIT
10 CUTTING HOLDER
11 CUTTING TOOL
12 CUTTING TOOL COVER
111 SHAFT BODY
112 INSERT
112a ONE SIDE SURFACE
113 AUXILIARY BLOCK
114 FIXED SHAFT
115 INSERT FIXING PORTION
116 HOLLOW PORTION
117 FIXING HOLE
118 INSERT ATTACHMENT SEAT
119 BLOCK ACCOMMODATION RECESS
120 CHANNEL
121 BODY PORTION
122 EXTENSION PORTION
123 ENGAGEMENT PORTION
124 FACE
W WORK

The invention claimed is:

1. A cutting tool cover that is configured to be set to a cutting tool, which cutting tool includes a shaft with a hollow shaft body and at least one insert attached to an end face of the shaft body and cuts by bringing the at least one insert into contact with a work while rotating the shaft body, the cutting tool cover comprising:
a body portion configured to be fixed to a portion of the shaft body so as to fixedly rotate with the shaft body, said body portion having an internal conduit defined by an internal wall of the body portion, which internal wall is configured to be positioned radially inward of an outer peripheral extremity of the end face of the hollow shaft body; and
an extension portion extended outward from a circumferential edge of the body portion over an entire circumference of the body portion and being configured to be axially fixed in position relative to the shaft so as to preclude axial adjustment, relative to the shaft, of a face of the extension surface that is most proximate to a contact surface of the work, and said extension portion is configured as to extend over the contact surface of the work when being cut and to extend radially outward of the outer peripheral extremity of the end face of the hollow shaft body, and said extension portion being formed of a material having a thermal conductivity value of at least 150W/m·K.

2. The cutting tool cover according to claim 1, wherein the face of the extension portion that is most proximate to the contact surface of the work extends in a plane parallel to a plane orthogonal to an axis of rotation of the shaft body.

3. The cutting tool cover according to claim 1, wherein the face of the extension portion that is most proximate to the contact surface of the work is a tapered surface that gradually approaches the work such that an outer circumference of the face is farther removed from the work than a more radially inward portion of the face.

4. The cutting tool cover of claim 1, wherein an upper surface of the extension portion positioned above the face that is most proximate to the contact surface of the work extends from the body portion as to form a flanged step region extending radially out from the body portion.

5. The cutting tool cover of claim 4, wherein the upper surface extends parallel to the face that faces the work.

6. The cutting tool cover of claim 4, wherein the flanged step region increases in axial thickness in going radially outward.

7. The cutting tool cover of claim 1, wherein the body portion includes a first interior cavity and a second interior cavity, the second interior cavity being enlarged relative to the first interior cavity and opening into the first interior cavity, and the enlarged second interior cavity being configured for receiving an insert fixing portion of the cutting tool.

8. The cutting tool cover of claim 1 further comprising a plurality of spaced apart cooling grooves on at least one of the extension portion and the body portion.

9. The cutting tool cover of claim 8, wherein the cooling grooves are either vertical grooves that extend parallel to an axis of rotation of the shaft body, or circumferential grooves that extend in respective horizontal planes.

10. The cutting tool cover of claim 1, wherein the body portion and extension portion are a monolithic unit.

11. The cutting tool cover according to claim 1, wherein the face of the extension portion that is most proximate to the contact surface of the work extends such that air drawn inward from the outer extremity flows within a passageway formed between an elongated region of the face and the contact surface of the work such that the passageway directs the air flow radially inward into contact with the at least one insert and then past the at least one insert and farther radially inward as to flow into a hollow flow conduit formed in the hollow portion of the cutting tool, which hollow flow conduit receives suction air flow during use of the cutting tool holder.

12. The cutting tool cover according to claim 1, wherein the face of the extension portion that is most proximate to the contact surface of the work is disposed at a height which positions the face of the extension portion between opposite axial ends of the at least one insert.

13. A cutting tool cover that is configured to be set to a cutting tool, which cutting tool includes a shaft with a hollow shaft body and at least one insert attached to an end face of the shaft body and cuts by bringing the at least one insert into contact with a work while rotating the shaft body, the cutting tool cover comprising:
a body portion configured to be fixed to a portion of the shaft body so as to fixedly rotate with the shaft body; and
an extension portion extended outward from a circumferential edge of the body portion over an entire circumference of the body portion, and being configured to be axially fixed in position relative to the shaft so as to preclude axial adjustment, relative to the shaft, of a face of the extension surface that is most proximate to a contact surface of the work, and said extension portion is configured as to extend over the contact surface of the work when being cut and extend radially outward of the at least one insert, and wherein the face of the extension portion that is most proximate to the contact surface of the work is a tapered surface that gradually separates from the work such that an outer circumference of the face is closer to the work than a more radially inward portion of the face, and said extension portion being formed of a material having a thermal conductivity value of at least 150 W/m·K.

14. A cutting holder, comprising:
a cutting tool which includes a hollow shaft body and at least one insert attached to an end face of the shaft body and cuts by bringing the at least one insert into contact with a contact surface of a work while rotating the shaft body; and
a cutting tool cover set to the cutting tool, wherein
the cutting tool cover includes:
a body portion fixed to the shaft body; and
an extension portion extended outward from a circumferential edge of the body portion over an entire circumference of the body portion and is configured as to extend over the contact surface of the work when being cut, and
the cutting tool further includes at least one channel that extends radially inward from an outer portion of the cutting tool toward a hollow portion of the cutting tool and guides air passing within a radially extending clearance passageway formed between the contact surface of the work and a face of the extension portion, said face extending radially inward from an outer extremity of the extension portion and also extending more horizontally than vertically such that air drawn inward from the outer extremity flows along the face and into the at least one channel such that the at least one channel directs the air flow radially inward into contact with the at least one insert and then farther radially inward as to flow past the at least one insert and into a hollow flow conduit formed in the hollow portion of the cutting tool, which hollow flow conduit receives suction air flow during use of the cutting tool holder.

15. The cutting holder according to claim 14, wherein the face of the extension portion extends in a plane parallel to a plane orthogonal to an axis of rotation of the shaft body.

16. The cutting holder according to claim 14, wherein the face of the extension portion is a tapered surface that gradually separates from the work such that an outer circumference of the face is closer to the work than a more radially inward portion of the face.

17. The cutting holder according to claim 14, wherein the face of the extension portion is a tapered surface that gradually approaches the work such that an outer circumference of the face is farther removed from the work than a more radially inward portion of the face.

18. The cutting tool cover of claim 14, wherein the hollow portion provides a suction conduit in the shaft body and said at least one insert is positioned radially outward of the suction conduit such that the cuts are drawn radially inward between the face of the extension portion and the contact surface of the work, and said body portion is configured to extend radially outward of the suction conduit.

19. A cutting apparatus, comprising:
a cutting tool that includes: a shaft with a hollow shaft body; and at least one insert releasably attached to an end face of the shaft body and cuts by bringing the at least one insert into contact with a work while rotating the shaft body;
a cutting tool cover set to the cutting tool; and
a suction unit which is positioned substantially at a central axis of rotation of the shaft body and which sucks chips generated by cutting with the cutting tool through a hollow portion of the cutting tool, wherein
the cutting tool cover includes:
a body portion fixed to the shaft body so as to fixedly rotate with the shaft body; and
an extension portion extended outward from a circumferential edge of the body portion over an entire circumference of the body portion and being configured to be axially fixed in position relative to the shaft so as to preclude axial adjustment, relative to the shaft, of a face of the extension surface that is most proximate to a contact surface of the work, and said extension portion is configured as to extend over the contact surface of the work when being worked, and said extension portion being formed of a material having a thermal conductivity value of at least 150 W/m·K, and
the cutting tool further includes at least one channel which extends radially to guide air to the hollow portion from an outer circumference of the cutting tool.

20. The cutting apparatus according to claim 19, wherein a face of the extension portion that is most proximate to the contact surface of the work extends in a plane parallel to a plane orthogonal to the central axis of rotation of the shaft body.

21. The cutting apparatus according to claim 19, wherein a face of the extension portion that is most proximate to the contact surface of the work is a tapered surface that gradually separates from the work such that an outer circumference of the face is closer to the work than a more radially inward portion of the face.

22. The cutting apparatus according to claim 19, wherein a face of the extension portion that is most proximate to the contact surface of the work is a tapered surface that gradually approaches the work such that an outer circumference of the face is farther removed from the work than a more radially inward portion of the face.

23. The cutting tool cover of claim 19, wherein the extension portion extends radially outward of the at least one insert.

\* \* \* \* \*